United States Patent [19]
Hoyerman

[11] 4,312,416
[45] Jan. 26, 1982

[54] SCALE TESTING VEHICLE HAVING AN AUXILIARY AXLE FOR SECTION TESTING

[75] Inventor: William H. Hoyerman, Deerfield, Ill.

[73] Assignee: General Body Company, Chicago, Ill.

[21] Appl. No.: 170,545

[22] Filed: Jul. 21, 1980

[51] Int. Cl.³ .................... G01G 19/52; G01G 23/01; B62D 61/12
[52] U.S. Cl. ...................................... 177/50; 73/1 B; 280/43.23; 177/1
[58] Field of Search .................... 177/50, 145; 73/1 B; 280/3, 9, 43.23

[56] References Cited
U.S. PATENT DOCUMENTS 3,785,297  1/1974  Barnard et al. ..................... 73/1 B
4,048,843  9/1977  Dunbar ................................ 73/1 B
4,249,633  2/1981  Dunbar ............................. 73/1 B X Primary Examiner—George H. Miller, Jr.
Attorney, Agent, or Firm—Wegner, Stellman, McCord, Wood & Dalton

[57] ABSTRACT

A vehicle with a vertically adjustable auxiliary axle and having its center of gravity located behind the auxiliary axle so that when said axle is moved down to a testing position where its wheels engage the ground, the front wheels of the vehicle are raised off the ground and the entire vehicle weight is supported by the rear wheels and the auxiliary wheels. When the auxiliary axle is in a testing position, the distance between the outer edges of the contact surfaces of the auxiliary and rear wheels is on the order of but not greater than 10 feet. The vehicle may be rolled over a scale platform while in the testing position so that a known weight is applied in an infinite number of 10 foot sections. The scale may be calibrated to accurately reflect the known weight under all different applications of that weight.

7 Claims, 3 Drawing Figures

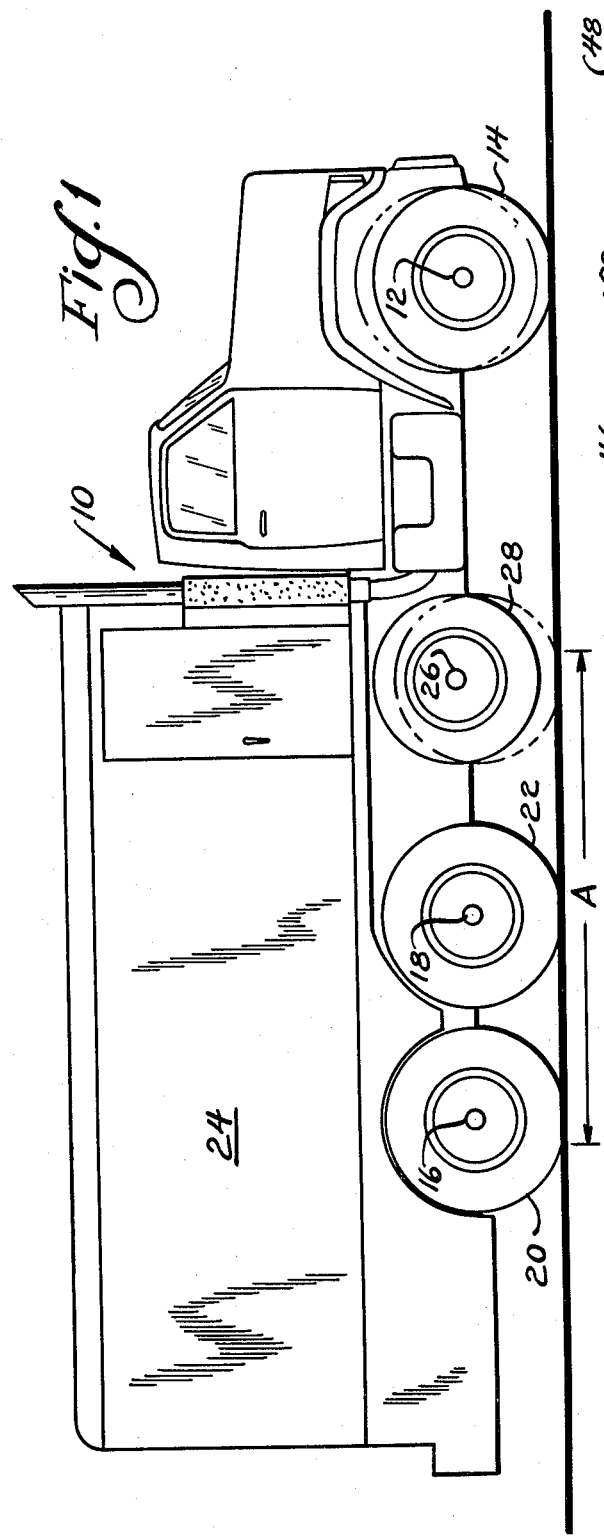
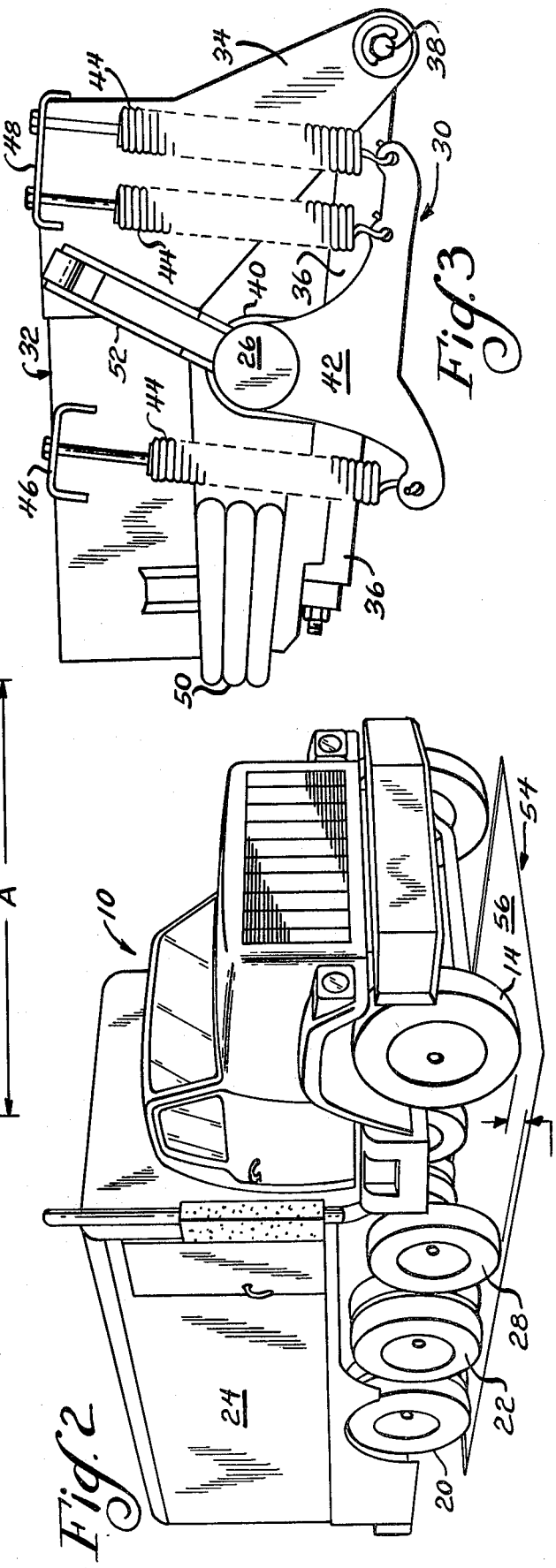

SCALE TESTING VEHICLE HAVING AN AUXILIARY AXLE FOR SECTION TESTING

BACKGROUND OF THE INVENTION

1. Field of the Invention

This invention relates to a scale testing vehicle, and more particularly to a vehicle for use in section testing and calibration of the vehicle scale.

2. Description of the Prior Art

Truck weighing stations need to be tested periodically to ensure their accuracy. Such stations include those along highways maintained by state highway departments to determine compliance with vehicular weight restrictions and those weigh stations at industrial plants which are used to determine the weight of truck deliveries.

Most states require that the scales alongside highways be calibrated at periodic intervals. These scales are calibrated by placing a known weight on the scales and comparing the reading obtained with the correct weight. On large scale platforms, commonly as long as 110 feet, the scale must be calibrated not only by placing a known weight on the platform but also by placing that weight on various sections of the platform. The standard section length used for such calibration is 10 feet. Such testing ensures that the scale provides the proper reading no matter how the weight is situated on the platform.

One testing method which has been used is to deposit blocks of a known weight on the scale. However, 20,000 lbs. is commonly deposited on the scales in this manner and it is difficult and very time consuming to move these weights from section to section on a single scale platform as is often required. Further, greatest scale errors have been found in the higher weight categories on large scale platforms so that test weights over 20,000 lbs. are preferred, state highway officials and the like having found it desirable to calibrate the scale with a known weight on the order of 40,000 lbs. Unfortunately, depositing that many weight blocks on each section would double the time currently required to calibrate the scale with 20,000 lbs.

Another method which has been used for section testing of large scale platforms is to provide a remotely controlled weight cart, that cart having a known weight and being small enough to apply the load to only a 10 foot section. However, such a cart must be transported between stations in a truck, taking up considerable space in the truck and limiting the amount of calibrated weights which may be transported. Further, such carts have been able to hold only a limited weight which is far less than the desired 40,000 lbs.

Still another device which has been used is disclosed in Dunbar U.S. Pat. No. 4,048,843, issued Sept. 20, 1977. In that patent, a truck is disclosed which can transport calibrated weights and which has hydraulic lifting legs for raising the front wheels of the truck so that the entire weight is supported by the rear wheels and the lifting legs. With this truck, a large weight may be relatively quickly applied to a 10 foot section for testing the scale. However, this weight must be applied at stopped positions and accordingly, the scale may not be tested over an infinite number of sections. Further, the lifting legs must be retracted and then re-extended each time that the truck is moved to a different section, showing the speed at which such testing may be done.

The present invention is directed to overcoming one or more of the problems as set forth above.

SUMMARY OF THE INVENTION

A scale testing vehicle is provided with an auxiliary testing axle which may be lowered from its transport position to a testing position so as to raise the front wheels of the vehicle off the ground, thereby causing the entire weight of the vehicle to be supported by the rear and auxiliary wheels through a 10 foot span. Suitable means are provided for raising and lowering the auxiliary axle and wheels between the transport and testing positions.

This vehicle carries in its enclosed bed a number of calibrated weights which together weigh approximately the same as the vehicle. By using these weights, a scale may be calibrated so that the weight of the truck along may be determined. By lowering the auxiliary wheels to the testing position, the truck may then be rolled across the scale platform to apply a large known weight, on the order of 40,000 lbs., to an infinite number of 10 foot sections. As the weight is applied, the scale is adjusted to ensure that the proper weight is indicated for all locations of the weight.

One object of the present invention is to provide a vehicle which can quickly and easily apply a weight on the order of 40,000 lbs. to a 10 foot section. Another object of the present invention is to provide a vehicle having its entire known weight supported in a 10 foot section wherein the vehicle may be rolled over the scale platform to continuously change the section to which the weight is applied. By being able to quickly change the section to which the weight is applied, the scale may be accurately calibrated in a relatively short period of time inasmuch as it takes only a moment to move the weight from one section to another.

BRIEF DESCRIPTION OF THE DRAWINGS

FIG. 1 is a side view of the scale testing vehicle in the transport position with the front and testing wheels shown in phantom in the testing position;

FIG. 2 is a perspective view of the vehicle in the testing position as located on a scale platform;

FIG. 3 is a side view of one type of conventional mounting which may be used for the auxiliary testing axle.

DESCRIPTION OF THE PREFERRED EMBODIMENT

A scale testing vehicle 10, particularly suited for use in testing scales having platforms 100 feet or more in length, is shown in FIGS. 1 and 2. The vehicle 10 alone weighs on the order of 20,000 lbs. and is supported, during normal over-the-road transport, by the wheels of three axles. As with any conventional truck of this size, the front axle 12 has single wheels 14 at each end while each of the rear axles 16,18 have two wheels 20,22 at each end thereof.

The vehicle 10 has an enclosed bed 24 in which up to twenty-eight 1,000 lb. calibrated weight blocks may be transported. Such weight blocks are well known in the field. Typically, twenty blocks are transported with the vehicle 10. Suitable means are included within the enclosed bed 24 for moving these weights into and out of the bed 24. One such structure in conventional use at this time includes a trolley suspended from an I-beam above the blocks. During use, the I-beam is extended beyond the rear end of the vehicle 10 and the trolley is moved along the I-beam to carry the blocks in or out of the enclosed bed 24 as desired.

An auxiliary testing axle 26 and wheels 28 are provided near the front end of the enclosed bed 24. This axle 26 can be vertically moved between testing and transport positions in a manner as hereinafter detailed. In the upper or transport position, the auxiliary wheels 28 are raised to ride safely above the road without engaging it. When the auxiliary wheels 28 are lowered to the testing position, they engage the ground and cause the front wheels 14 to be lifted approximately three inches off the ground (as shown in phantom in FIG. 1). The vehicle 10 is designed so that the center of gravity is located behind the auxiliary axle 26, ensuring that the weight is thus supported by the rear wheels 20,22 and the auxiliary wheels 28. Of course, the vehicle body would tilt slightly in the testing position though that tilting is not indicated by FIG. 1.

Suitable means are used to mount the auxiliary axle 26 so that it may be raised and lowered between the above-described positions. FIG. 3 shows the right side of a conventional axle mounting 30 which has heretofore been used for a variety of purposes.

The axle mounting 30 has a frame 32 which is secured on its upper side to the underside of the vehicle frame. At its forward end, the frame 32 has a tongue 34 which extends downward, pivotably supporting a cylinder 36 on each side by a suitable pin or bolt 38. The auxiliary axle 26 is secured to the cylinders 36 by flanges 40 on each cylinder 36. A yoke 42 is also mounted to the auxiliary axle 26 and is connected to tension springs 44 which are secured at their upper ends to brackets 46,48 on the frame 32.

An expandable air bag 50 is mounted between the frame 32 and the outer end of the cylinder 36. This air bag 50 is connected to a source of compressed air in the vehicle 10 and is constructed so that when compressed air is injected into the bag 50, the bag 50 expands in a generally vertical direction. The air bag shown in FIG. 3 is restrained so as to create reduced diameter segments, causing the bag 50 to telescope between its expanded and contracted positions.

Accordingly, when the air bags 50 are expanded, the cylinders 36 are pivoted downward, moving the auxiliary axle 26 downward with them. This moves the auxiliary wheels 28 to a ground engaging and testing position. To change to the transport position, the compressed air is removed from the air bag 50 and the springs 44 apply sufficient upward force to the yoke 42 to lift the auxiliary axle 26 and wheels 28 off the ground. The axle 26 is restrained against undesirable nonvertical motion by a guide 52.

As already detailed, when the auxiliary axle 26 is lowered, the front wheels 14 are raised approximately three inches off the ground. Thus, the entire weight of the truck is supported on the auxiliary wheels 28 and the two sets of rear wheels 20,22. The back rear axle 16 and auxiliary axle 26 are mounted so that when in the testing position, the distance A between the outer edges of the contact surface of their tires 20, 28 is on the order of but not greater than 10 feet. Of course, the distance between the two axles 16,26 must be less than 10 feet because the tires 20,28 contact the ground over an area of the tire surface.

The back rear axle 16 is driven so that the vehicle 10 may be rolled straight ahead when in the testing position. It may not be turned however because the steering wheels (the front wheels 14) are off the ground.

In order to test a scale 54 for weighing vehicles and the like, the vehicle 10 is backed up to the scale platform 56 so that the twenty calibrated weight blocks may be removed from the enclosed bed 24 and placed on the scale platform 56. A reading is taken with the known weight of 20,000 lbs. on the scale platform 56.

The weight blocks are then removed from the platform 56 and placed on the ground next to the platform 56. Once so removed, the vehicle 10 is driven onto the scale platform 56 and a reading is taken with the vehicle 10 in its testing position, the section on which it rests being the same section on which the weight blocks were placed. Inasmuch as the vehicle 10 weighs on the same order as the twenty calibrated weight blocks, the reading taken from the blocks may be used to make an initial calibration of the scale to enable the vehicle's exact weight to be determined. This is necessary because the vehicle weight varies according to the driver weight, fuel load, etc.

The weight blocks are then placed back in the bed 24 and the vehicle 10 is moved back on the scale platform 56 so that its back rear wheels 20 are just on the platform 56 and the vehicle 10 is directed straight down the platform 56. The auxiliary axle 26 is then lowered so that the front wheels 14 are lifted off the platform 56, resulting in the entire known weight of approximately 40,000 lbs. being supported by the rear and auxiliary wheels 20,22,28. This results in the entire known weight being applied through a ten foot section on the platform 56, the ten foot section being the standard section size used for calibrating such scales.

Readings may then be taken as the vehicle 10 is slowly run across the length of the scale platform 56. Continuous readings may be taken on the scale, effectively resulting in testing of an infinite number of sections and thereby greatly improving the accuracy of the corrections made in calibrating the scale 54 as a result of this test. These correcting adjustments may be made with the vehicle 10 in the testing position or they may be made at a later time from the recorded results. Alternatively, incremental readings may be taken over as many sections as is desired. The calibration of the scale 54 is thereafter adjusted as necessary, those adjustments being indicated by the difference between the reading and the known weight at each of the various sections tested.

If desired, the vehicle 10 can alternatively be moved from one position to another and stop at each position. This may be necessary when, for example, the engine vibrations of the vehicle 10 interfere with the reading on the scale 54. It is, of course, a simple matter to move the vehicle 10 between such fixed positions and may be accomplished very quickly.

Other aspects, objects and advantages of this invention can be obtained from a study of the drawings, the disclosure and the appended claims.

I claim:

1. In a vehicle for testing a vehicle weighing scale, said vehicle having a front axle and a rear driven axle for conventional transport, the improvement comprising an auxiliary vertically adjustable axle mounted between said front and rear axles, said auxiliary axle at its upper position raising its appended tires off the ground for conventional transport, and said adjustable axle at its lower position causing its tires to engage the ground so as to raise the tires of the front axle off the ground.

2. The improvement of claim 1, wherein the distance in a front-rear direction of the vehicle from the front edge of the ground engaging surface of one tire of the auxiliary axle to the rear edge of the ground engaging surface of the tire on the same side of said vehicle on said rear axle is on the order of but does not exceed ten feet.

3. The improvement of claim 1, wherein the center of gravity of said vehicle is behind said auxiliary axle.

4. A vehicle for use in calibrating a truck weighing scale by applying a weight onto a ten foot section, comprising:
a vehicle body having front and rear tire equipped wheels;
an enclosed bed on said vehicle, said bed supporting for transport a plurality of calibrated weights;
means for loading and unloading said weights from said vehicle bed; and
auxiliary tire equipped wheels mounted to said vehicle between said front and rear wheels, said auxiliary wheels being supported above the ground for a transport position and vertically adjustable to a testing position engaging a scale platform wherein said auxiliary wheels in the testing position raise said front wheels off said platform so that the entire weight of said vehicle is supported by said auxiliary and rear wheels.

5. The vehicle of claim 4, wherein the distance between the outer edges of the surfaces of contact of said auxiliary wheels and said rear wheels with said platform is on the order of but not greater than ten feet.

6. The vehicle of claim 4, wherein the center of gravity of said vehicle is between said auxiliary and rear wheels.

7. A method for calibrating a scale used to weigh large trucks and the like, the steps comprising:
depositing a known weight on a scale platform and initially calibrating said scale;
removing said known weight and locating a testing vehicle on said scale platform;
determining the weight of said vehicle;
loading said known weight onto said vehicle as a load therein and then locating said vehicle on said scale platform; and
moving said vehicle across said scale platform while continuously reading the indicated weight of the vehicle and its load for finally calibrating said scale.

* * * * *